Dec. 29, 1964  J. J. ZELLER  3,163,725
ELECTRIC SWITCH MECHANISM FOR SELECTIVE
OPERATION OF PLURAL SWITCHES
Filed Sept. 1, 1961  3 Sheets-Sheet 1

INVENTOR.
JOSEF J. ZELLER
BY

Dec. 29, 1964    J. J. ZELLER    3,163,725
ELECTRIC SWITCH MECHANISM FOR SELECTIVE
OPERATION OF PLURAL SWITCHES

Filed Sept. 1, 1961    3 Sheets-Sheet 2

INVENTOR.
JOSEF J. ZELLER
BY

Dec. 29, 1964  J. J. ZELLER  3,163,725
ELECTRIC SWITCH MECHANISM FOR SELECTIVE
OPERATION OF PLURAL SWITCHES

Filed Sept. 1, 1961  3 Sheets-Sheet 3

INVENTOR.
JOSEF J. ZELLER
BY
William H. Schmeling

United States Patent Office 3,163,725
Patented Dec. 29, 1964

3,163,725
ELECTRIC SWITCH MECHANISM FOR SELECTIVE OPERATION OF PLURAL SWITCHES
Josef J. Zeller, Asheville, N.C., assignor to Square D Company, Park Ridge, Ill., a corporation of Michigan
Filed Sept. 1, 1961, Ser. No. 136,402
6 Claims. (Cl. 200—18)

This invention relates to control mechanisms for electric motors and more particularly, to float operated mechanisms for effecting automatic operation of a plurality of electric motors under certain predetermined conditions.

In certain installations, such as a duplex pumping system wherein a pair of electric motor driven pumps are employed, each capable of handling a normal load, frequently it is desirable that the work of handling the loads be divided between the two pumps by effecting automatic alternate operation thereof and if an abnormal load condition should arise the idle pump will be automatically set into operation to assist the active pump, or, if one of the pumps should fail, the other pump will operate intermittently for normal loads and continuously for abnormal loads without being effected by the failure of the other pump.

A control for accomplishing the foregoing is disclosed in the United States Patent 2,349,522 which was issued May 23, 1944, to Donald W. Scofield and assigned to the assignee of this application. The present invention relates to an improvement in the control disclosed in the Scofield patent. The improvement resides in an arrangement whereby the control mechanism will not only effect alternate operation of a pair of electric motor driven pumps under normal operating conditions and dual operation thereof under abnormal operating conditions as achieved by the control in the Scofield patent, but also that the control can be selectively adjusted so that either of the motor driven pumps can be selected to operate intermittently during normal conditions and under abnormal conditions or upon failure of the selected motor driven pump, the other motor driven pump will be automatically caused to operate either intermittently or continuously, depending on the condition of the work load.

One of the objects of the present invention is to provide an improved control mechanism for selectively effecting either alternate sequential operation of a pair of motor driven pumps under normal load conditions or operation of either one of said pumps under normal conditions and for effecting dual operation of the pumps under abnormal operating conditions.

Another object of the present invention is to provide an improved form of a control mechanism for automatically controlling the operation of a pair of electric motor driven pumps in a selected predetermined sequence.

Further objects and features of the invention will be readily apparent to those skilled in the art from the following specifications and drawings which illustrate a preferred embodiment of my invention in which.

Figure 1:
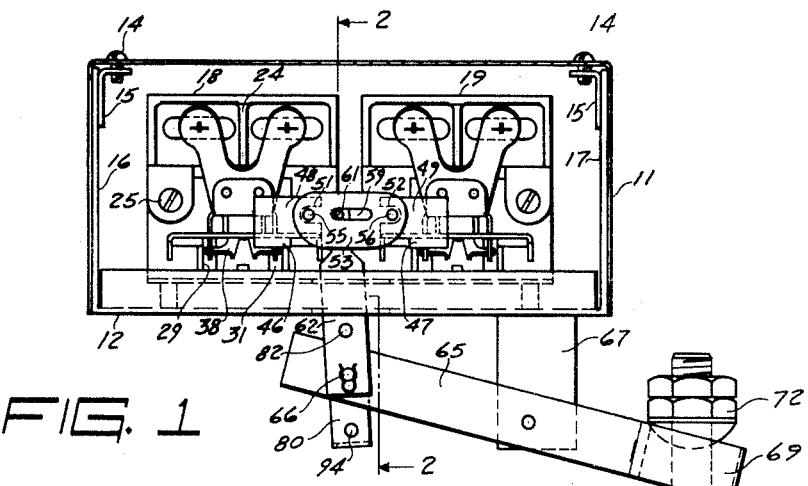
FIG. 1 is a front elevational view of a control mechanism incorporating the features of the present invention.

The control mechanism as illustrated in the drawings comprises a housing 11 formed of a generally U-shaped base 12 of sheet metal and a generally U-shaped enclosing cover 13, with the cover 13 being secured to the base 12 by studs 14 passing through the cover 13 and threaded into flanges 15 provided upon opposite legs 16 and 17 of the base 12. Supported upon base 12 in side by side relationship are a pair of identical electrical switching units 18 and 19. Since the switching units 18 and 19 are identical, only the unit 18 will be described in detail. The switching unit 18 comprises a supporting bracket 21 rigidly secured to the base 12. An insulating member 22 having a recess 23 therein divided by a barrier wall 24 is mounted upon bracket 21 by a pair of studs 25. Stationary contact elements 26 are provided within the recess 23 on either side of the barrier wall 24. An operating lever 27 pivotally engages leg 28 of the supporting bracket 21. Spaced apart members 29 and 31 are upwardly bent from bracket 21 with each pressed out to provide a notch therein for receiving the ends of the leg portions 33 of a contact lever or member 34 whereby the contact lever 34 will be pivotally supported. A generally U-shaped fiber piece 35 is secured to the lever 34 and carries the contact element 36 on each leg thereof for cooperation with the stationary contacts 26 for making and breaking electrical circuits therethrough. Pivotally mounted within notches in leg portions 37 of lever 34 is a flipper member 38. A tension spring 39 interconnects the operating lever 27 and the flipper member 38 and serves to maintain the operating lever 27, the contact lever 34 and the flipper member 38 in assembled relationship, for the force exerted thereby biases the operating lever 27 into engagement with bracket 21 and the contact lever 34 and the flipper member 38 into their respective bearings. Clockwise movement of the operating lever 27 by means to be hereinafter described effects movement of the end of spring 39 secured thereto to carry it across the pivot of flipper member 38, thereby changing the direction of the line of force of the spring to effect a snap movement of the flipper member 38 to carry the end of the spring 39 secured to the flipper through the pivot of the contact lever 34. The free end of the flipper 38 in its snap movement will strike flange 41 of the contact lever a hammer blow substantially simultaneously with the movement of the end of spring 39 through the pivot of the contact lever 34 to effect a snap movement of the contact lever in a counter-clockwise direction to its Off position. To limit the counterclockwise movement of the contact lever 34, the lower edge of leg portion 37 of the contact lever engages a pin 42 provided upon base 12. A generally L-shaped member 43 disposed between the switching units 18 and 19 and secured to the base 12 by a stud 44 carries a cross piece 45 engageable by the operating levers 27 to determine the extent of clockwise movement thereof. To effect actuation of operating levers 27, pieces 46 and 47 are welded to the under sides of the levers 27 and are bent as at 48 and 49, the bent portions 48 and 49 being substantially normal to the planes of the faces of the operating levers 27. The adjacent vertical edges of the portions 48 and 49 are notched as at 51 and 52. An actuating member 53 comprising a pair of parallel plates 54 maintained in spaced relationship by a pair of pins 55 and 56 disposed near either extremity of the plates 54 is operatively associated with the operating levers 27 of both switching units 18 and 19, the pins 55 and 56 being receivable respectively by the notches 51 and 52 of the members 48 and 49, thus providing a pin and slot connection between the actuating member 53 and the operating levers 27, as is illustrated in FIG. 1. The plates 54 are each centrally provided with a horizontal slot 59, which slots are adapted to slideably receive a pin 61 mounted at the upper end of a reciprocating member 62. The reciprocating member 62 comprises a pair of elongated members and extends from the interior of the housing 11 through aligned openings in base 12. The lower extremities of the members 62 are pivotally connected to an actuating lever 65 by a pin 66 whereby an operative connection is effected between the actuating member 53 and the actuating lever 65; the actuating lever 65 in turn is pivotally secured to a supporting element 67 carried by the base 12. The lever 65 includes a portion return bent upon itself to provide an opening as at 69, through which a float rod 71 extends. A pair of hex nuts 72 are mounted upon the float rod at either side of the piece 65 being spaced apart to provide a lost motion connection between the float rod 71 and the lever 55. A float 73 is secured to the end of float rod 71 and may be contained in a tank, a cistern, well or other liquid reservoir and is movable in response to the rise and fall of the liquid therein for actuation of the float rod 71 and thereby the lever 65 and the switch assemblies 18 and 19.

Figure 10:
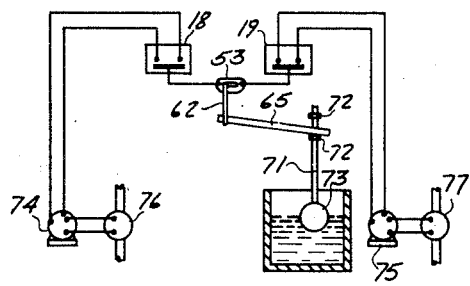
FIG. 10 is a schematic view illustrating the application of the invention to a pumping system.

As hereinbefore stated, the control mechanism illustrated is particularly adapted for use with a pair of electric motor driven pumps. FIG. 10 illustrates schematically a pumping system in which switching units 18 and 19 are electrically associated respectively with electric motors 74 and 75 which are used to drive pumps 76 and 77, with the switching units 18 and 19 being responsive to movements of the float 73.

Figure 4:
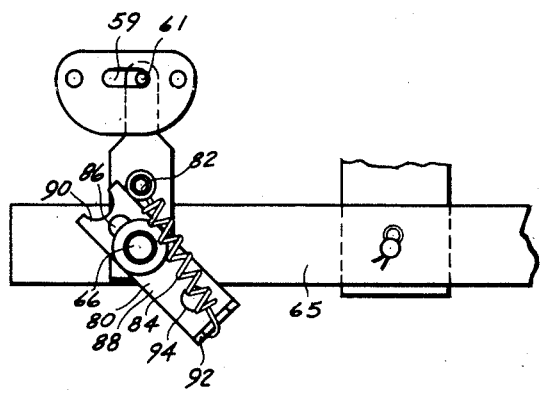
FIG. 4 is a view taken along line 4—4 in FIG. 2, showing the switch selector mechanism in one position.

The structure according to my invention hereinafter described is particularly suited for use with switches of the type disclosed in the Scofield patent includes a means which will selectively maintain the pin 61 in either end of slot 59 or will permit the pin 61 to oscillate in the slot 59 as will be hereinafter described. This means preferably includes a member 80, a spring anchor pin 82 and a spring 84. The spring anchor pin 82 is suitably secured to the reciprocating members 62 at a position between pins 66 and 61. The member 80 is provided with a slot 86 which extends lengthwise in a main body portion 88 of member 80. The slot 86 receives pin 66 to movably and rotatably mount the member 80 on the common pivot for reciprocating members 62 and the actuating lever 65. The main body portion 88 has a notch 90 at one end to receive pin 82 and thereby maintain member 80 in one of its three positions. Extending from the other end of the main body portion 88 of member 80 is a spring anchoring portion 92. A stop 94 is positioned on the body portion 88 between the slot 86 and the spring anchoring portion 92. The spring 84 has its respective ends connected to the spring anchor pin 86 and spring anchoring portion 92 to normally urge member 80 so the notch 90 engages spring anchor pin 82 when the member 80 is positioned as shown in FIG. 1 or so the stop 94 engages the lower edge of the actuating lever 65, as in FIG. 4 or 5. The elongated slot 86 permits movement of member 80 to the three positions when the spring anchoring portion is used as a purchase point for manually applied force and the member 80 is moved via the slot connection between pin 66 and slot 86 against the force of the spring 84 to any of the indicated positions. When the manual force on member 80 is released, the spring 84 will maintain the member 80 in the positions shown in FIGS. 1, 4 and 5.

Figure 2:
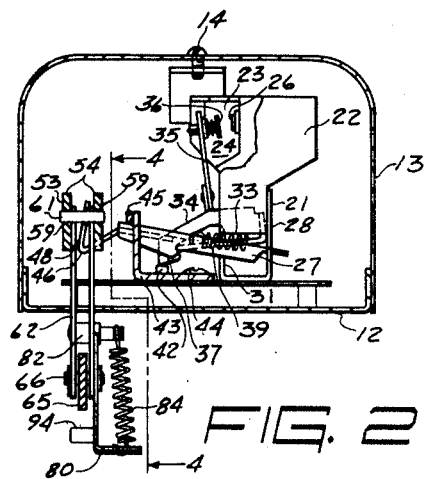
FIG. 2 is a sectional view taken along line 2—2 in FIG. 1.
Figure 3:
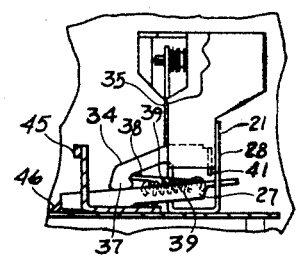
FIG. 3 is a view somewhat similar to FIG. 2 with the contacts of the switch mechanism engaged.
Figure 7:
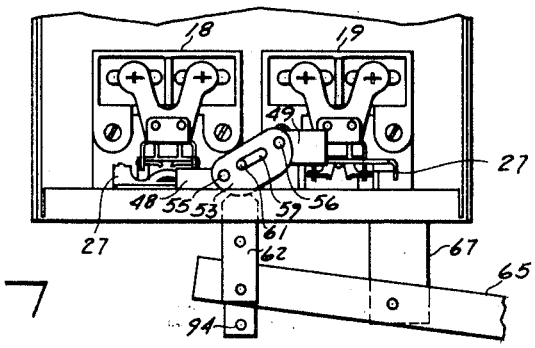
FIG. 7 is a view somewhat similar to FIG. 1 but with the right hand switch in open position and the left hand switch closed.

The operation of the control mechanism will now be described:

Assuming the control mechanism to be in the position illustrated in FIG. 1 wherein both of the electric switches 18 and 19 are open, the pumps 76 and 77 therefor being idle and the float 73 in its lower position, a rise in the liquid level in the container, the contents of which are to be controlled, will effect an upward movement of the float 73 and the float rod 71 to rotate lever 65 counterclockwise, exerting a force which pulls connecting member 62 generally downward. As shown in FIG. 1, pin 61 which connects the member 62 and the actuating member 53, lies within slot 59 and to the left of the center line thereby, whereby the force exerted on pin 61 by the member 62 in its downward movement acts to effect rotation of the actuating member 53 and the pin 55 carried thereby in a counterclockwise direction about pin 56. The pin 55 being received within notch 51 of piece 48 will effect a counterclockwise movement of this piece to thereby move operating lever 27 of the switching unit 18 to which it is connected also counterclockwise from the position it occupies as shown in FIG. 2 to carry the line of force of spring 39 through the pivots of flipper 38 and contact lever 34 to effect snap movement of the movable contact 36 into engagement with stationary contact 26 to start the motor 74 that is in circuit therewith to effect the operation of its associated pump to begin reduction of the level of the liquid in the container. The various elements will then occupy the position illlustrated in FIG. 7 at the time operation of the pump 76 is effected. With a fall in the level of the liquid, lever 65 will be rotated clockwise by the float rod 71 and the pin 61 will first be moved from the position of FIG. 7 in which it occupies the left hand end of the slot, diagonally upwardly past the centerline and to the right hand end, so that continued reduction of the liquid level will result in the force transmitted from the float and through the members 62 and 65 being exerted upon the upper defining edge of slots 59 to rotate the member 53 clockwise about pin 56 to carry pin 55 in a like direction. When the liquid level has been restored to normal, pin 55 in engagement with operating lever 27 of switching unit 18 will have effected clockwise movement of the lever to a point where it will perform the switching operation to open the contacts and stop the motor 74 and pump 76.

With another rise in the liquid level the lever 65 will again be rotated effecting downward movement of the member 62 and of pin 61 carried thereon. Since the pin 61 lies to the right of the center of the member 53, the applied force will rotate the member 53 clockwise about pin 55 effecting clockwise movement of pin 56. Pin 56 being in engagement with the member 49 will move it to effect movement on the operating lever 27 of the switching unit 19 to snap the movable contact thereof as described in the circuit making position illustrated in FIG. 8, thus starting the second motor 75 to drive pump 71 to begin the work of reducing the liquid level.

With the falling of the liquid level the float 73 will cause the lever 65 to rotate clockwise, moving member 62 upwardly to first carry pin 61 from the right hand end of slot 59 diagonally upwardly past the center line of the slot and to the left hand end so that the force provided by the float 73 will be transmitted through members 62 and 65 to act upon the actuating member 53 to rotate the actuating member counterclockwise about the pin 55 to move pin 56, and through this pin's engagement with portion 49 to effect a pivotal movement of the operating lever 27 of switching unt 19 to effect snap movement of the movable contacts thereof to the disengaged position illustrated in FIG. 1.

Figure 8:
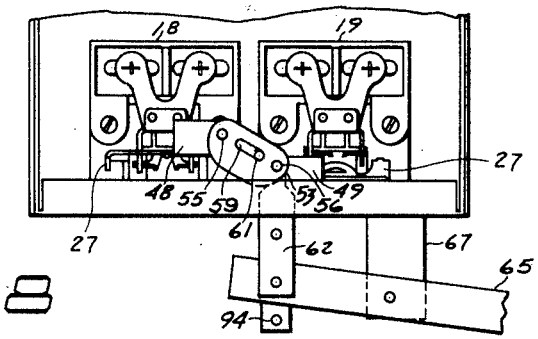
FIG. 8 is a view similar to FIG. 7 but with the left hand switch open and the right hand switch closed.
Figure 9:
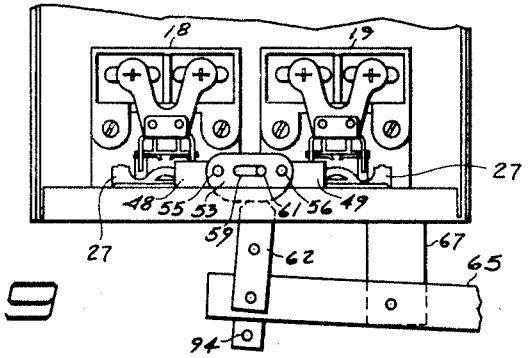
FIG. 9 is a view similar to FIG. 7, but with both switches in closed positions.

Assume the actuating member 53 to have been rotated clockwise about pin 55 so that the control mechanism affects the position illustrated in FIG. 8 and assume conditions to be abnormal so that pump 77 controlled by switching unit 19 is not capable of properly caring for the load, whereby the liquid level continues to rise. Under these circumstances, lever 65 will be rotated further than normally necessary in a counterclockwise direction to exert a continued force upon the actuating member 53 through pin 61 to rotate the actuating member about 56, moving pin 55 and thereby operating lever 27 of switching unit 18 to thus effect a closing of the contacts thereof to put the second electric motor driven pump 76 into operation. With both pumps 76 and 77 running, the control mechanism assumes the position of FIG. 9. It is to be noted that under abnormal conditions, the lever 65 rotating in but one direction effects alternate rotation of the actuating member 53 first about pin 55 and then about pin 56. Both of the pumps 76 and 77 will continue to run until the load falls to a point where but one pump is necessary to handle the work. When the load falls to this point, lever 65 rotates clockwise to exert force through member 62 and pin 61 upon the actuating member 53 to rotate this member about pin 55 and thus actuate the operating lever 27 of the switching unit 19 to effect disengagement of the contacts thereof to stop pump 77, but leaving pump 76 active to assume the burden.

If either of the switching units 18 or 19 or the electric motors or pumps should fail due to any reason, the actuating lever 65 and the connecting means 62 will still be effective to rotate the actuating member 53 to bring about a movement of the operating lever 27 of the switching unit still effective to operate the electric motor driven pump controlled thereby, intermittently for normal loads, and, if an abnormal load should arise, to hold the operable switching unit closed to run the pump continuously. Thus loads placed upon the pumping system will be cared for unless both pumping units should break down.

From the foregoing it is apparent when the member 80 is in its intermediate position, that is, when notch 90 engages anchor pin 82, the control will operate to alternate and sequentially operate the contacts of switches 18 and 19 so that either one of the switches will open before the other is closed for normal operating loads and in event of abnormal loads, both switches will be closed. The pin 61 oscillates in slot 59 and moves to the respective ends thereof to accomplish the alternate operation of the switches 18 and 19. The means which includes member 80, the spring anchor 82 and spring 84 acts in connection with lever 62 as a toggle linkage. When the member 80 is moved against the force of spring 84 so notch 90 is out of engagement with spring anchor pin 82 and then rotated counterclockwise to the position shown in FIG. 4, the stop 94 will engage the upper surface of lever 65 to the right of the centerline between pin anchor 82 and pivot pin 66. When member 80 is thus positioned, the pin 62 will move to the right end of slot 59 so that during normal operating conditions switch 19 will be operated and only during abnormal operating conditions will switch 18 be operated in a sequence described in connection with FIGS. 8 and 9.

Figure 5:
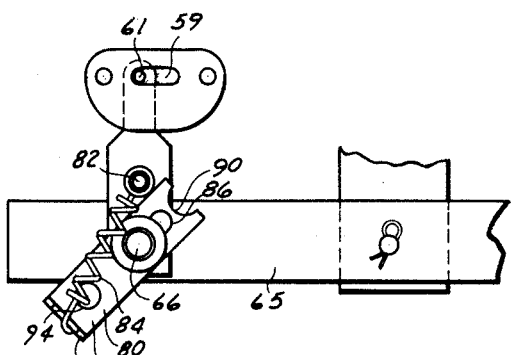
FIG. 5 is a view similar to FIG. 4 showing the selector mechanism in another position.
Figure 6:
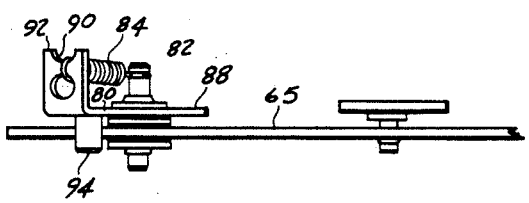
FIG. 6 is a top view of the parts in FIG. 5.

When the member 80 is rotated clockwise to the position shown in FIG. 5, the stop 94 will be to the left of the centerline through pins 61 and 82 so the tension force exerted by spring 84 will cause lever 62 to move and maintain pin 61 to the left end of slot 59. Thus during normal operating conditions switch 18 will operate and during abnormal operating conditions switch 19 will operate in the sequence described in connection with FIGS. 8 and 9.

A control mechanism has thus been provided which will operate a pair of electric motor driven pumps in alternate sequence to divide the work of caring for normal loads on the system and will effect operation of both of the pumps in unison upon the occurrence of abnormal conditions when one of the pumps cannot handle the work imposed upon it or will cause either of the pumps to handle the work during normal loads and both to operate under abnormal loads.

While certain preferred embodiments of the control mechanism have been specifically disclosed, it is understood that the invention is not limited thereto, as many variations will be readily apparent to those skilled in the art and the invention is to be given its broadest possible interpretation within the terms of the following claims.

What is claimed is:

1. Control means for operating a pair of electric motors including a pair of electric switches, each of said electric switches controlling the operation of one of said motors and having relatively movable contacts and an operating lever for ececting movement of said contacts comprising; means connected with said levers for operating said switches in one mode of operation wherein the switches operate alternately and in sequence opening either one of said switches before the other is closed during normal operations and for sequentially closing both switches under abnormal conditions, and means selectively positionable in a pluralty of positions and operably connected with the first mentioned means for operating said switches in said one mode of operation when said second mentioned means is in one of said positions and for selectively operating only one of said switches during said normal conditions when the second mentioned means is in another of said positions.

2. Control means for operating a pair of electric motors comprising; a pair of switches each arranged for controlling the operation of one of said motors and having a pair of switch contacts and a lever for actuating the switch contacts, a rotatable actuating member carried by said levers, lever means connected with said member for rotating said member and operating said switch levers in one mode of operation wherein the switches operate alternately and in sequence for opening either one of said switches before the other is closed during normal operation and for closing both switches during abnormal operations, and means selectively positionable in any one of a plurality of positions and connected with the rotatable actuating member and said lever means for selectively operating only one of said switches during said normal conditions when the second mentioned means is in one of said positions and for operating said switches in said one mode of operation when the second mentioned means is in another of said positions.

3. Control means for operating a pair of electric motors, comprising; a pair of electric switches each connectible with one of said motors and having an actuating lever for opening and closing the switch associated therewith, a rotatable lever carried by the switch actuating levers, said rotatable lever having an elongated slot therein, an operating lever means having a pin oscillatably movable in the elongated slot to the extreme ends thereof for alternately and sequentially operating the actuating levers of the switches for opening either one of said switches before closing the other during normal operating conditions and for closing both switches during abnormal operating conditions and a multi positionable means manually movable to either of two operable positions for selectively continuously maintaining the pin at either end of the slot for selectively operating only one of said switches during normal operating conditions and manually movable to an inoperative position for permitting the pin to oscillate in said slot.

4. In a control device, the combination comprising; a pair of electric switches each having closable switch contacts for controlling individual circuits and an operating lever for effecting relative movement of said switch contacts mechanism for operating said electric switches alternately and in sequence, opening one before the other closes, said mechanism comprising; an actuating member for moving said operating levers, a pair of spaced pivots about each of which said actuating member is adapted to rotate, means having a slideable connection with said actuating member and alternately movable to either one of two predetermined positions upon said actuating member to effect rotation thereof in opposite directions about either one of the spaced pivots to alternately move said operating levers, and a multi positionable means manually movable to one operable position for maintaining said first mentioned means in only one of said predetermined positions to selectively close one of said switches before closing the other and manually movable movable to an inoperable position and permit said first mentioned means to slideably move to either of said predetermined positions.

5. The combination as recited in claim 4 wherein the actuating member is provided with an elongated slot and the slideable connection with the first mentioned means is provided by a pin which is oscillatably movable in the slot.

6. The combination as recited in claim 5 wherein the selectible means is arranged to continuously position the pin in either end of the elongated slot.

References Cited in the file of this patent

UNITED STATES PATENTS 2,349,522    Scofield _____ May 23, 1944